United States Patent [19]
Tsutsui et al.

[11] Patent Number: 5,740,136
[45] Date of Patent: Apr. 14, 1998

[54] DISK DRIVING DEVICE AND METHOD FOR OPTICAL RECORDING AND REPRODUCION WITH ACCELERATION/ DECELERATION OF FOCUSING MEANS BEING BASED ON A FOCUS ERROR SIGNAL LEVEL

[75] Inventors: Keiichi Tsutsui; Motohisa Kobayashi, both of Kanagawa, Japan

[73] Assignee: Sony Corporation, Tokyo, Japan

[21] Appl. No.: 691,136

[22] Filed: Aug. 1, 1996

[30] Foreign Application Priority Data

Aug. 4, 1995 [JP] Japan ................................. 7-199356

[51] Int. Cl.⁶ ...................................................... G11B 7/00
[52] U.S. Cl. ..................... 369/44.25; 369/44.27; 369/94
[58] Field of Search ........................ 369/94, 112, 44.26, 369/44.25, 44.27, 44.28, 53, 54, 58, 93

[56] References Cited

U.S. PATENT DOCUMENTS 5,499,231   3/1996   Fennema et al. ...................... 369/94 X

*Primary Examiner*—Paul W. Huber
*Attorney, Agent, or Firm*—Frommer Lawrence & Haug LLP; William S. Frommer

[57] ABSTRACT

A disk driving device for use in recording and/or reproducing data on an optical recording medium having a plurality of recording layers. When a focus jump operation is executed between the recording layers, an actuator displaces an objective lens in response to a selectively generated acceleration or deceleration pulse and a focus error signal. Instability of the focus jump operation derived from noise superimposed on the focus error signal or from sensitivity variations in the actuator is eliminated.

22 Claims, 14 Drawing Sheets

F I G. 6A FOCUS ERROR SIGNAL

F I G. 6B JUMP PULSE

F I G. 6C ZERO-CROSSING AREA DETECTION SIGNAL

F I G. 6D SERVO OPENING/CLOSING SWITCH CONTROL SIGNAL

F I G. 6E LENS FOCUSING DISPLACEMENT SPEED

FIG. 9A  RF ENVELOPE

FIG. 9B  FOCUS ERROR SIGNAL

FIG. 9C  JUMP PULSE

FIG. 9D  ZERO-CROSSING DETECTION SIGNAL

FIG. 9E  SERVO OPENING/CLOSING SWITCH CONTROL SIGNAL

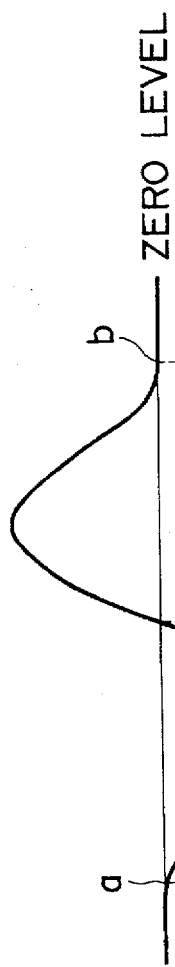
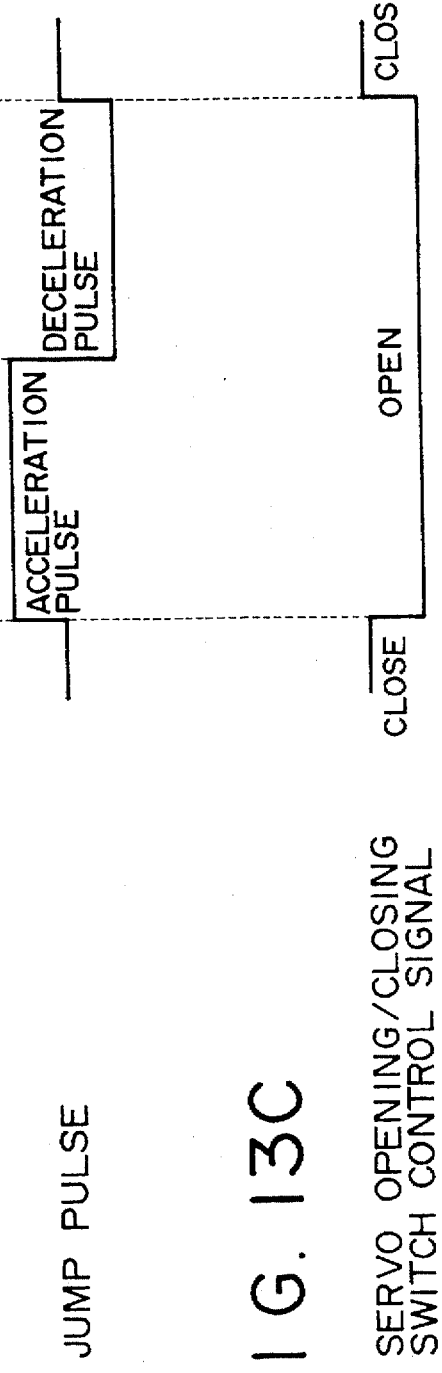
FIG. 13A  FOCUS ERROR SIGNAL
FIG. 13B  JUMP PULSE
FIG. 13C  SERVO OPENING/CLOSING SWITCH CONTROL SIGNAL

DISK DRIVING DEVICE AND METHOD FOR OPTICAL RECORDING AND REPRODUCION WITH ACCELERATION/ DECELERATION OF FOCUSING MEANS BEING BASED ON A FOCUS ERROR SIGNAL LEVEL

BACKGROUND OF THE INVENTION

The present invention relates to tan optical disk driving device and method, and more particularly to a device and a method for recording on and/or reproducing data from an optical recording medium, such as a disk, having a plurality of recording layers to increase its recording capacity.

FIG. 12 is a sectional view showing an optical disk 41 having a plurality of recording layers thereon to increase its data recording capacity. A disk base 42 of optical disk 41 is composed of a transparent layer, such as polycarbonate, and an A-recording layer 46 and a B-recording layer 47 are formed on its bottom surface. The A-recording layer 46 is composed of a semi-transparent film and permits partial transmission of incident light therethrough while partially reflecting the light. The B-recording layer 47 is composed of a totally reflective film of aluminum or the like and totally reflects incident light. A protective film 45 is formed on the B-recording layer 47 so as to protect the recording layers from corrosion or external damage.

A data pit 43 formed in the A-recording layer 46 is read by focusing the focal point of a light beam L1 emitted from a laser or the like on the A-recording layer 46 and monitoring the light reflected from the A-recording layer 46. Similarly, a data pit 44 formed in the B-recording layer 47 is read by focusing the focal point of the light beam L2 on the B-recording layer 47 and monitoring the light reflected from the B-recording layer 47. Light beams L1 and L2 are produced from the same source. During the reproduction of data from each layer, a lens focus servo control controls an optical pickup unit in a manner so as to reduce the focus error signal to zero.

When data is reproduced in succession from the two recording layers (A and B), the focal point must quickly transit from the light beam L1 focused on layer A to the light beam L2 focused on layer B, or vice-versa. Hereinafter, this transition is referred to as a focus jump. The focus jump is executed by driving an objective lens which serves to converge the light beam onto layer A or layer B, as the case may be.

FIGS. 13A to 13C are waveform diagrams showing the relationship between the focus error signal (FIG. 13A) obtained in a focus jump and a driving signal (FIG. 13B) for driving the objective lens. Points "a" and "b" represent focus positions on the A-recording layer 46 and B-recording layer 47, respectively, and both points are at the zero level of the focus error. A known focus error signal whose magnitude and direction represent the error is obtained near the vicinity of the points "a" and "b".

In a focus jump from the point "a" to the point "b", the focus servo loop is interrupted or "opened" (FIG. 13C), and a driving voltage (acceleration jump pulse) (FIG. 13B) is applied to accelerate the objective lens toward the point "b". When the objective lens reaches an intermediate point between the two points "a" and "b", another driving voltage (deceleration jump pulse) (FIG. 13B) is applied to decelerate the objective lens. When the objective lens is near the vicinity of the point "b", the focus servo loop is reconnected (FIG. 13C), i.e., reset to a closed state. The zero-crossing point of the focus error signal, as shown in FIG. 13A, is used to detect the intermediate point between the two points "a" and "b".

FIG. 14 is a waveform diagram graphically illustrating the relationship between a focus error signal and the focus position where the interlayer distance representing the distance between two recording layers is long. The ragged edges of the focus signal in FIG. 14 result from the signal noise superimposed thereon. Switching from acceleration to deceleration occurs at an intermediate point in the jump distance corresponding to the zero-crossing point of the focus error signal. However, as shown in FIG. 14, it is difficult to detect this intermediate point from the focus error signal due to signal noise and variations of the interlayer distance representing the distance between two recording layers, i.e., due to uneven surfaces of the recording medium (possibly caused by dust or manufacturing defects).

Further, the detection of the intermediate point is made more difficult by the sensitivity variation of the lens-driving actuator. Since the motor speed of the actuator is affected by the frequency of the focus error signal, the displacement speed of the objective lens varies over time depending on the frequency of the focus error signal. The variable displacement speed causes the intermediate point (position where the focus error signal crosses the zero level) to change with time. Thus, the intermediate point is not stable and varies with the actuator's sensitivity variation. Nevertheless, it is desirable to execute a stable focus jump despite the aforementioned difficulties.

OBJECTS OF THE INVENTION

Therefore, it is an object of the present invention to provide a method and apparatus for driving a pickup for an optical recording medium having a plurality of recording layers that can execute a stable focus jump despite the variation in the interlayer distance, noise superimposed on the focus error signal, or sensitivity variation in the objective-lens driving actuator.

Another object of the present invention is to provide a method and apparatus for driving a pickup for an optical recording medium as aforesaid, which can be used in recording and/or reproducing apparatus.

Various other objects, advantages and features of the present invention will become readily apparent from the ensuing detailed description, and the novel features will be particularly pointed out in the appended claims.

SUMMARY OF THE INVENTION

In accordance with an aspect of this invention, an apparatus and method for driving a pickup for an optical recording medium having a plurality of recording layers is provided. A focus jump is executed from one recording layer to another by selectively accelerating and decelerating an objective lens in the pickup.

The acceleration and deceleration of the objective lens is controlled when a focus error signal is within a reference range. Preferably, the deceleration rate is greater than the acceleration rate.

In accordance with an aspect of this invention, the reference range is modified according to the level of the signal reflected from the optical disk (i.e., the intensity of the reflected light).

In accordance with another aspect of this invention, the deceleration of the lens is halted when the duration of the deceleration period exceeds a predetermined period.

BRIEF DESCRIPTION OF THE DRAWING

The following detailed description, given by way of example, and not intended to limit the present invention solely thereto, will best be understood in conjunction with the accompanying drawings in which:

FIGS. 13A to 13C are waveform diagrams showing the relationship between a focus error signal and an objective lens driving signal in execution of a focus jump.

DESCRIPTION OF THE PREFERRED EMBODIMENTS

Hereinafter an optical disk apparatus incorporating preferred embodiments of the pickup driving device of the present invention are described in detail with reference to the accompanying drawings.

Figure 1:
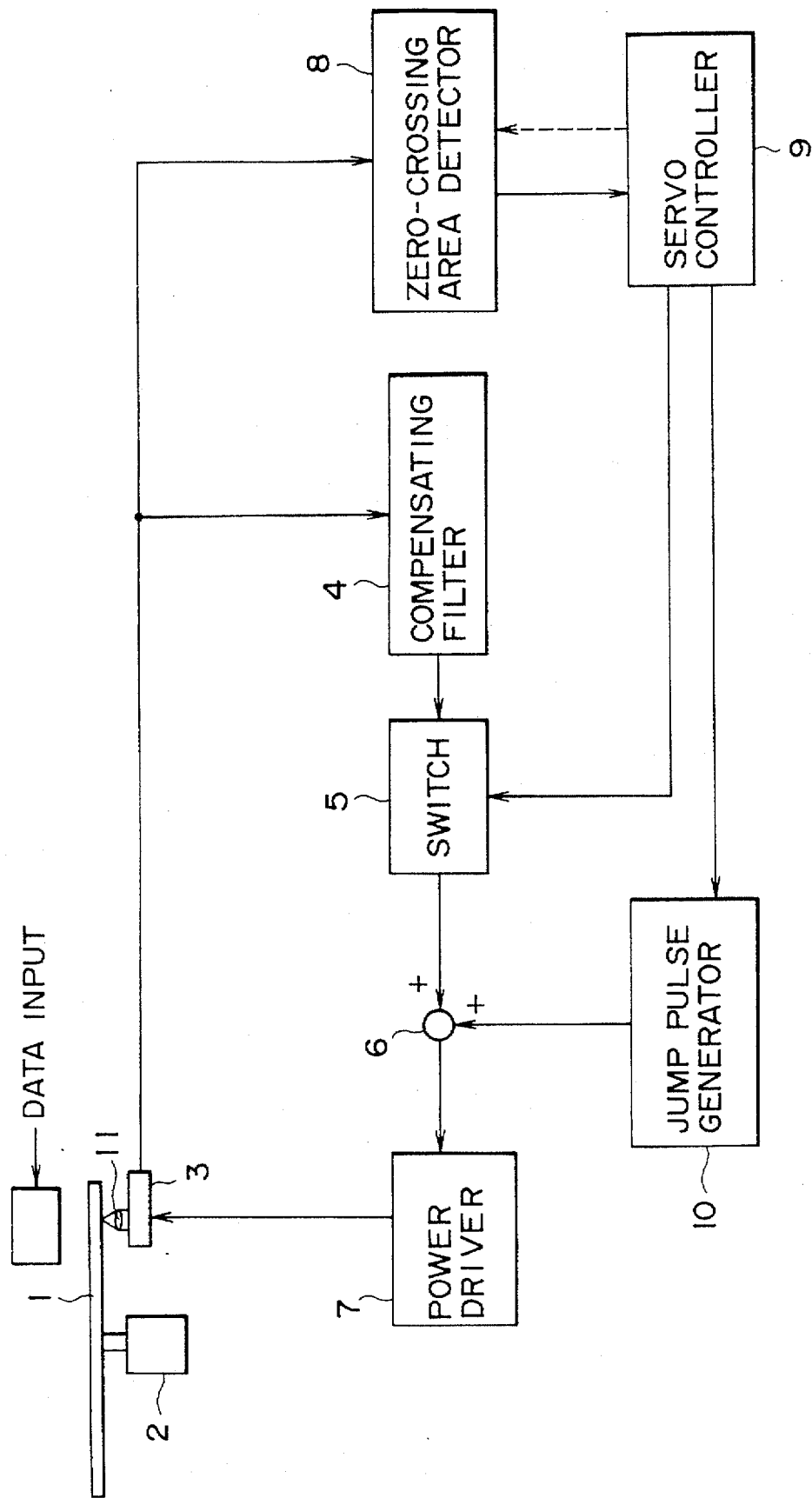
FIG. 1 is a block diagram illustrating an embodiment of the pickup driving device of the present invention incorporated in an optical disk recording and reproducing apparatus.

FIG. 1 is a block diagram showing an embodiment of a pickup driving device in accordance with the present invention incorporated into an optical disk recording and/or reproducing apparatus. As illustrated, the apparatus is comprised of an optical pickup 3, a compensating filter 4, a zero-crossing area detector 8, a servo controller 9, and a jump pulse generator 10.

Figure 12:
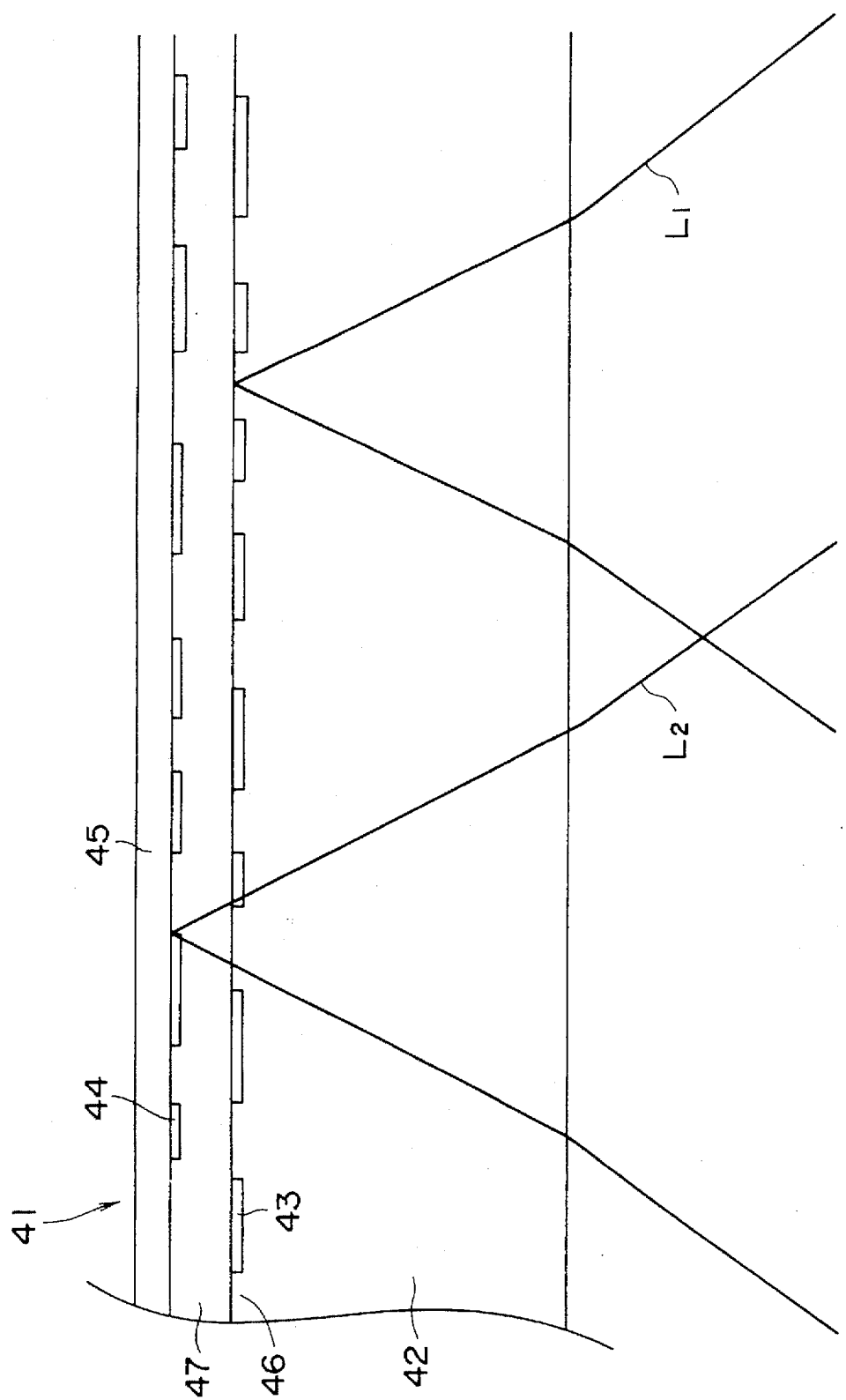
FIG. 12 is a sectional view showing the structure of an optical disk having a plurality of data recording layers.
Figure 14:
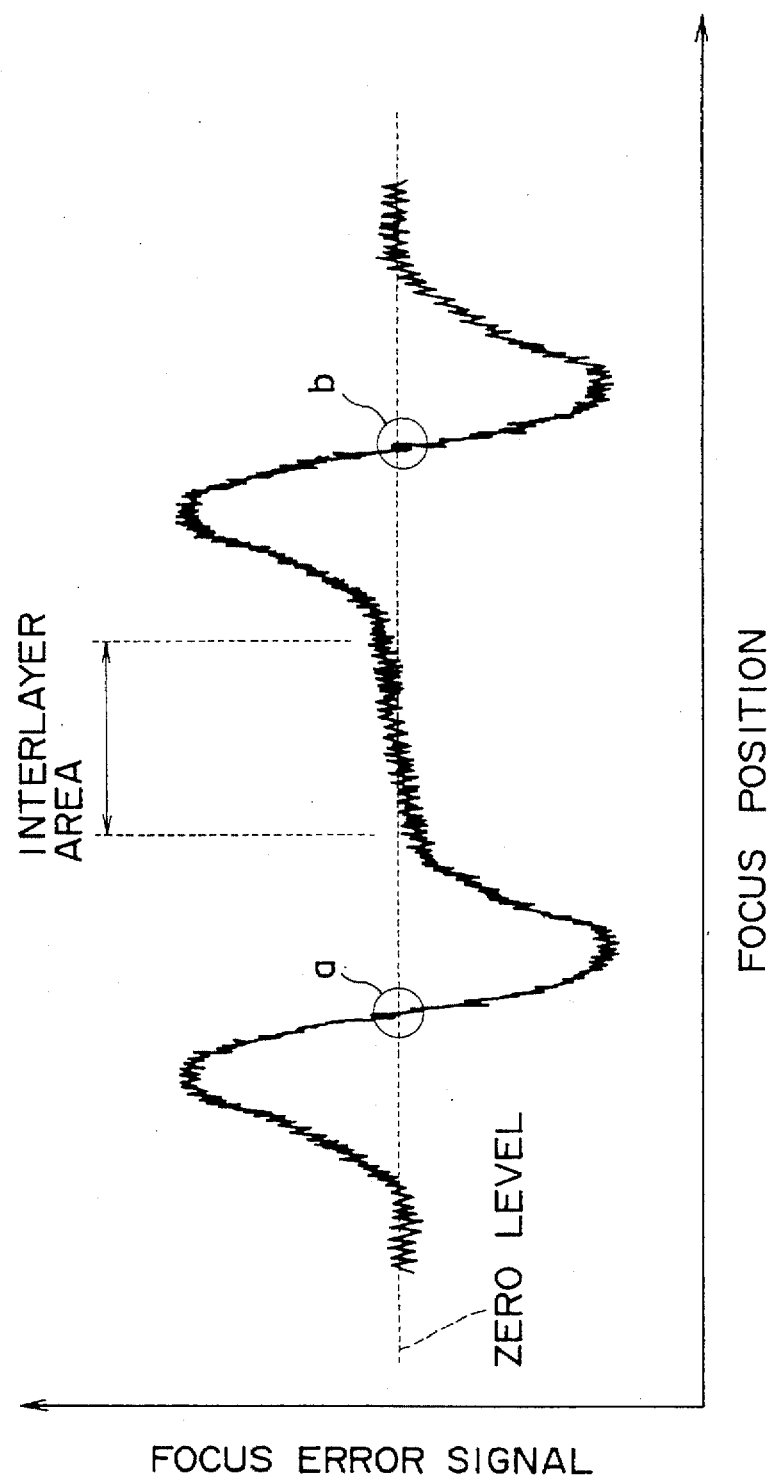
FIG. 14 is a waveform diagram showing the relationship between a focus error signal and a focus position when noise is superimposed on the focus error signal in an optical disk having a plurality of data recording layers with a long interlayer distance.

An optical disk 1, which preferably is the same as the aforementioned optical disk 41 in FIG. 12, is provided with a plurality of recording layers (A-recording layer 46 and B-recording layer 47). A spindle motor 2 rotates the optical disk 1 at a predetermined rate. An optical writing device 15 is adapted to write data on the optical disk and may comprise conventional elements normally used for this purpose and known to those of ordinary skill in the art. The optical pickup 3 includes an objective lens 11 and is provided with a lens driving actuator (not shown) and a light detector (not shown) to produce a focus error signal corresponding to a deviation in the focus of the objective lens with respect to a light beam focused thereby on layer A or layer B.

A focus servo loop for adjusting the focus of the objective lens 11 comprises compensating filter 4 supplied with the focus error signal outputted from the optical pickup 3, a switch 5 and a power driver 7 for driving the lens actuator in the optical pickup 3. The compensating filter 4 improves the stability and follow-up performance of the focus servo by adjusting the gain and phase of the focus error signal in response to the level of that focus error signal and supplies the adjusted focus error signal to an adder 6 via switch 5. The switch 5 selectively supplies the focus error signal to the adder 6 and thereby selectively interrupts the focus servo loop. The power driver 7 is adapted to generate a drive signal in response to the signal supplied thereto to drive the lens actuator of the optical pickup 3.

The zero-crossing area detector 8 determines if the focus error signal outputted, from the optical pickup 3 is within the zero-crossing area, i.e., within a predetermined reference range of ±V level of the zero level. The zero-crossing area detector 8 supplies its determination result to the servo controller 9 which utilizes the result to control the operation of the switch 5 and the jump pulse generator 10. In response to the servo controller 9, the jump pulse generator 10 selectively generates the acceleration and deceleration signals (pulses) and supplies the same to the adder 6. The adder 6 adds the output signal of the jump pulse generator 10 to the focus error signal supplied by the compensating filter 4 via the switch 5 and supplies the summed signals to power driver 7.

The manner in which the servo controller drives the lens actuator from one recording layer to another now will be described in conjunction with the flow chart of FIG. 2 and the timing diagrams of FIGS. 3A–3F. It is assumed that on/off action of the switch 5 corresponds to a control action for connecting ("closing") and interrupting ("opening") the focus servo loop.

Figure 2:
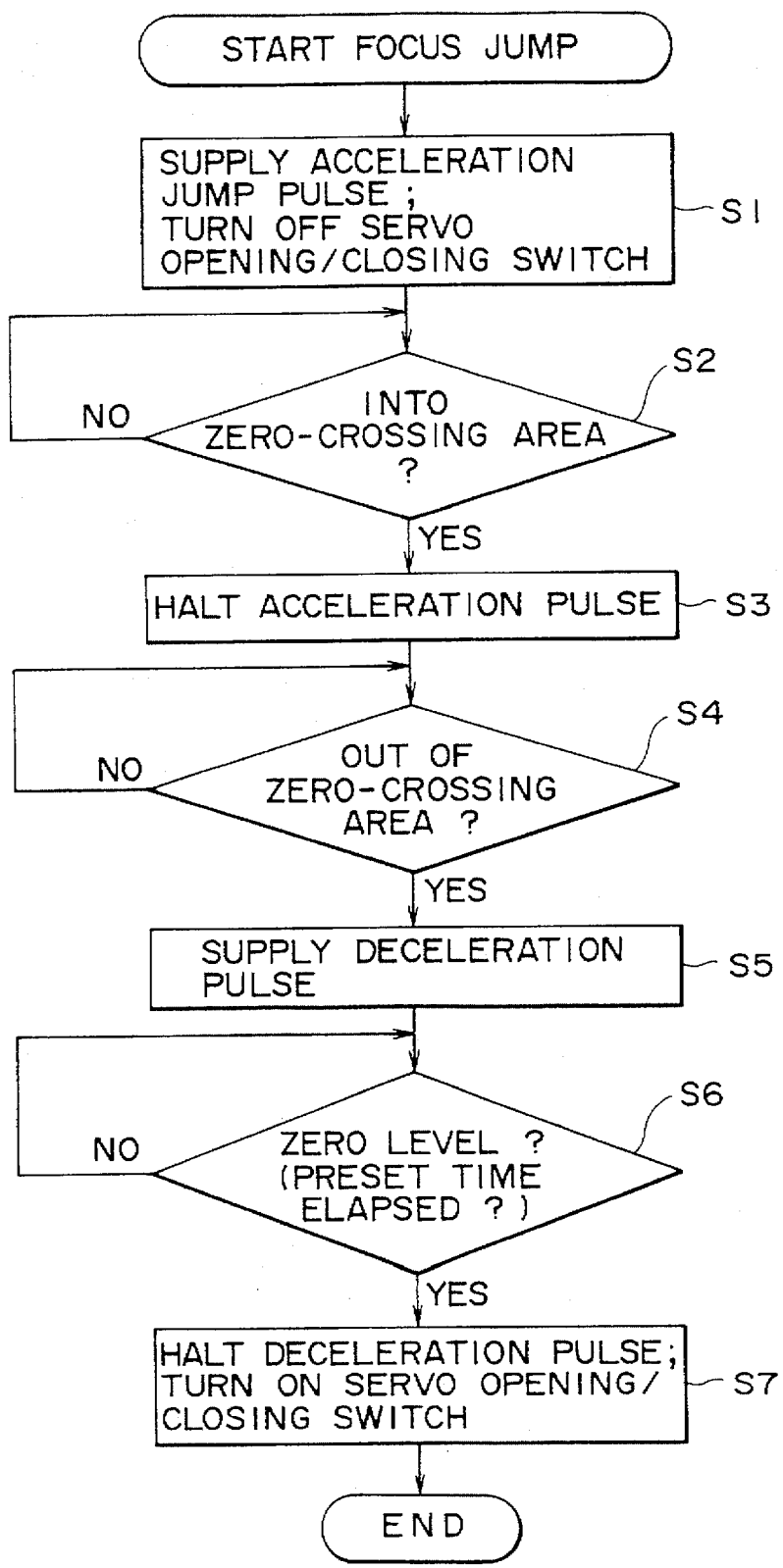
FIG. 2 is an operational flow chart of the pickup driving device of FIG. 1.
Figure 3:
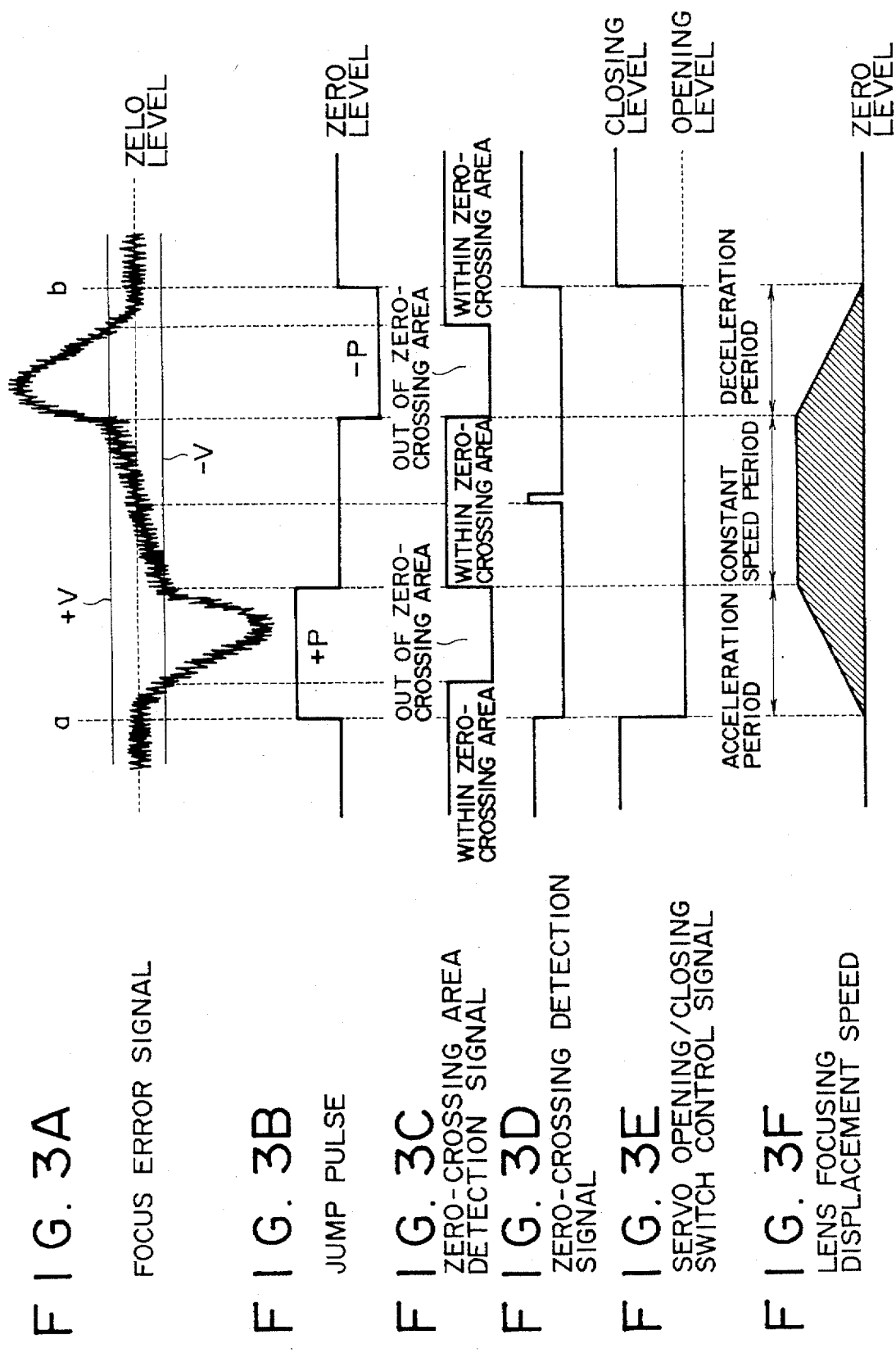
FIGS. 3A to 3F are timing diagrams illustrating an example of the output waveforms generated by the pickup driving device of FIG. 1.
Figure 4:
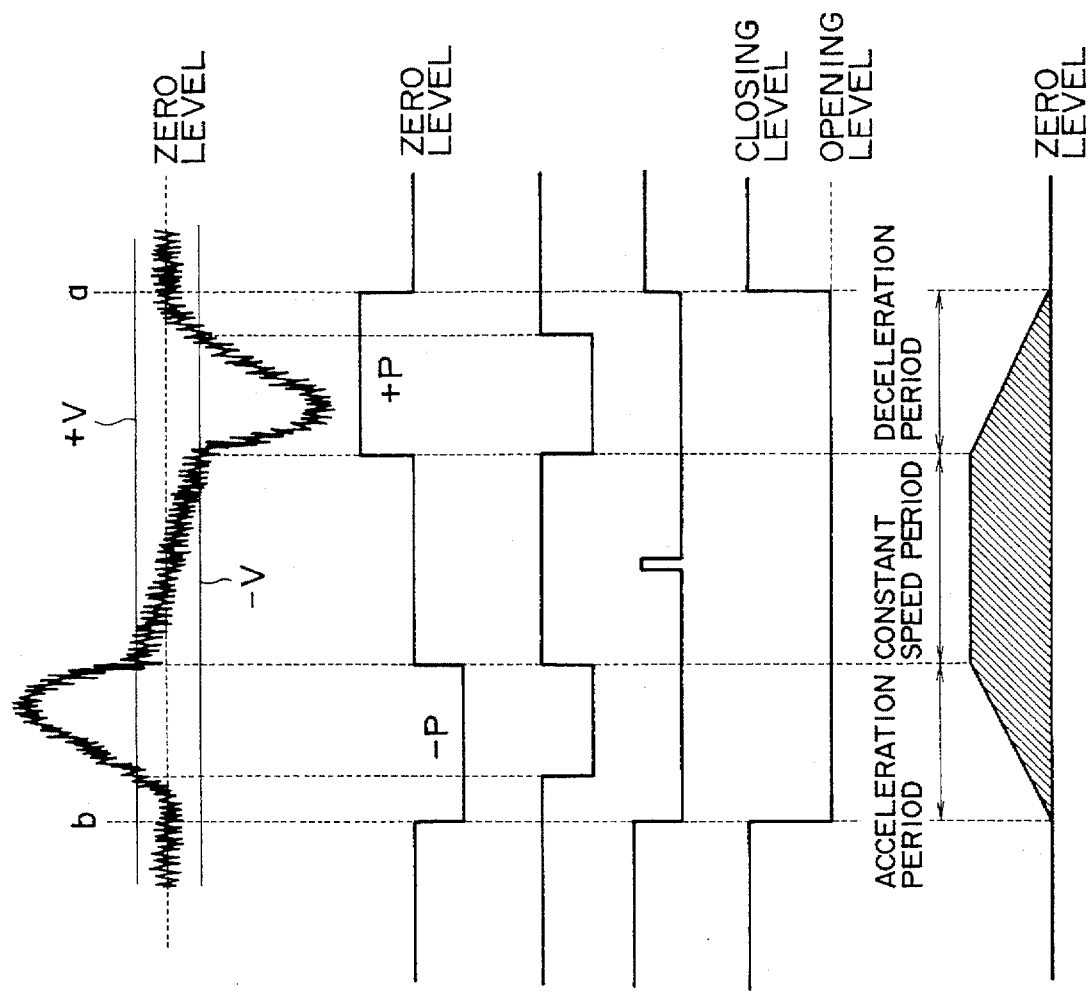
FIGS. 4A to 4F are timing diagrams illustrating another example of the output waveforms generated by the pickup driving device of FIG. 1.

When a focus jump is initiated to drive the lens actuator to focus the focal point of the light beam on the B-recording layer 47 from the A-recording layer 46, as represented by instruction S1 of FIG. 2, the servo controller 9 sends a control signal (low level signal in FIG. 3E) to switch 5 for interrupting the focus servo loop and sends a control signal to jump pulse generator 10 for generating an acceleration pulse having a +P level (FIG. 3B). In response to the acceleration pulse, the power driver 7 drives the lens actuator at an accelerated velocity (FIG. 3F) to focus the light beam on the B-recording layer, i.e., the focus position "b".

If the zero-crossing detector 8 detects that the focus error signal (FIG. 3A) outputted from the optical pickup 3 is within the reference range of −V to +V (preset limits of the zero-crossing area), inquiry S2 is answered in the affirmative (high-level detection signal in FIG. 3C) and the servo controller 9 sends a control signal to jump pulse generator 10 for halting the acceleration pulse, as represented by instruction S3. That is, the lens actuator now is driven at a constant speed (FIG. 3F). However, if inquiry S2 is answered in the negative, that is, if the focus error signal is not in the reference range, inquiry S2 is repeated until the zero-crossing detector 8 determines that the focus error signal is within the zero-crossing area.

If the zero-crossing area detector 8 detects that the focus error signal is no longer within the zero-crossing area, i.e., the focus error signal exceeds +V, inquiry S4 is answered in the affirmative (low-level detection signal in FIG. 3C) and the servo controller sends a control signal to the jump pulse generator for generating a deceleration pulse having a −P level (FIG. 3B), as represented by instruction S5. In response to the deceleration pulse, the power driver 7 drives the lens actuator at a decelerating velocity (FIG. 3F) because the "out of zero-crossing area signal" (low-level detection signal in FIG. 3C) signifies that the objective lens 11 is approaching the desired focus position "b" on the B-recording layer. However, if inquiry S4 is answered in the negative, that is, if the focus error signal still is in the reference range, inquiry S4 is repeated until the zero-crossing detector 8 determines that the focus error signal is outside of the zero-crossing area.

After supplying the deceleration pulse, if the focus error signal is detected by the zero-crossing area detector 8 to be within the zero-crossing area, inquiry S6 is answered in the affirmative (high level detection signal in FIG. 3C) and remains at the substantially zero level (high level detection signal in FIG. 3D), and the servo controller sends a control signal to the switch 5 for reconnecting the focus servo loop (high level signal in FIG. 3E) and sends a control signal to the jump pulse generator for halting the deceleration pulse, as represented by instruction S7. That is, the focus jump is completed and the focal point of the light beam is now focused on the B-recording layer 47.

FIGS. 4A–4F are timing diagrams illustrating the same process described hereinabove with respect to FIGS. 3A–3F, except a focus jump is initiated to drive the lens actuator to focus the focal point of the light beam on the A-recording layer 46 from the B-recording layer 47, i.e., focusing in the reverse direction. Instead of repeating the description of the focus jump, the description of FIGS. 4A–4F is omitted. It will be seen, of course, that waveforms 4A and 4B are the mirror images of waveforms 3A and 3B.

Figure 5:
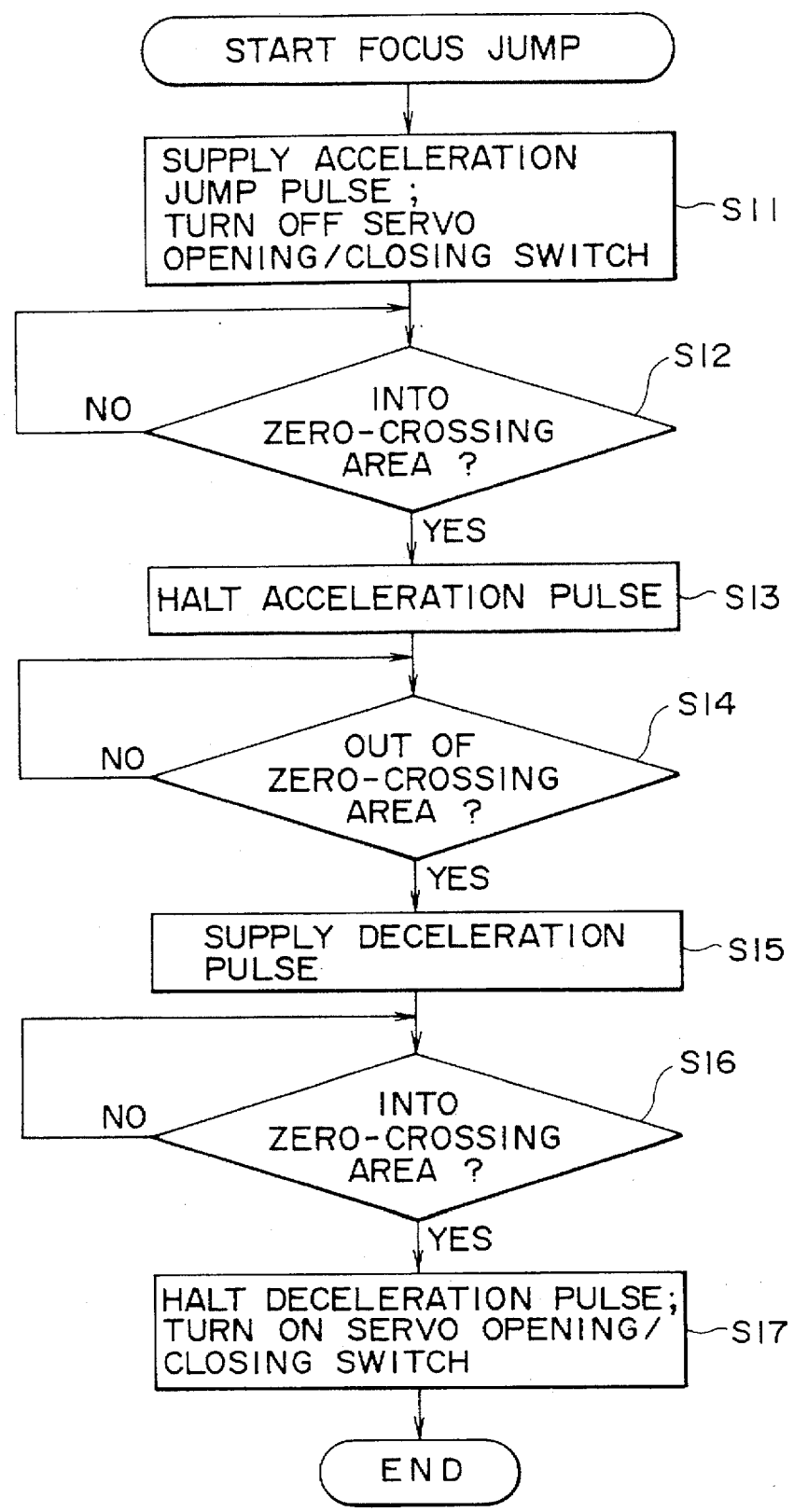
FIG. 5 is an flow chart to which reference will be made in describing another embodiment of the pickup driving device of FIG. 1.

In accordance with another aspect of the present invention, the gain of the deceleration signal is made greater than that of the acceleration signal to execute the focus jump faster. The manner in which the servo controller drives the lens actuator to execute the focus jump faster now will be described in conjunction with the flow chart of FIG. 5 and the timing diagrams of FIGS. 6A–6E.

Figure 6:
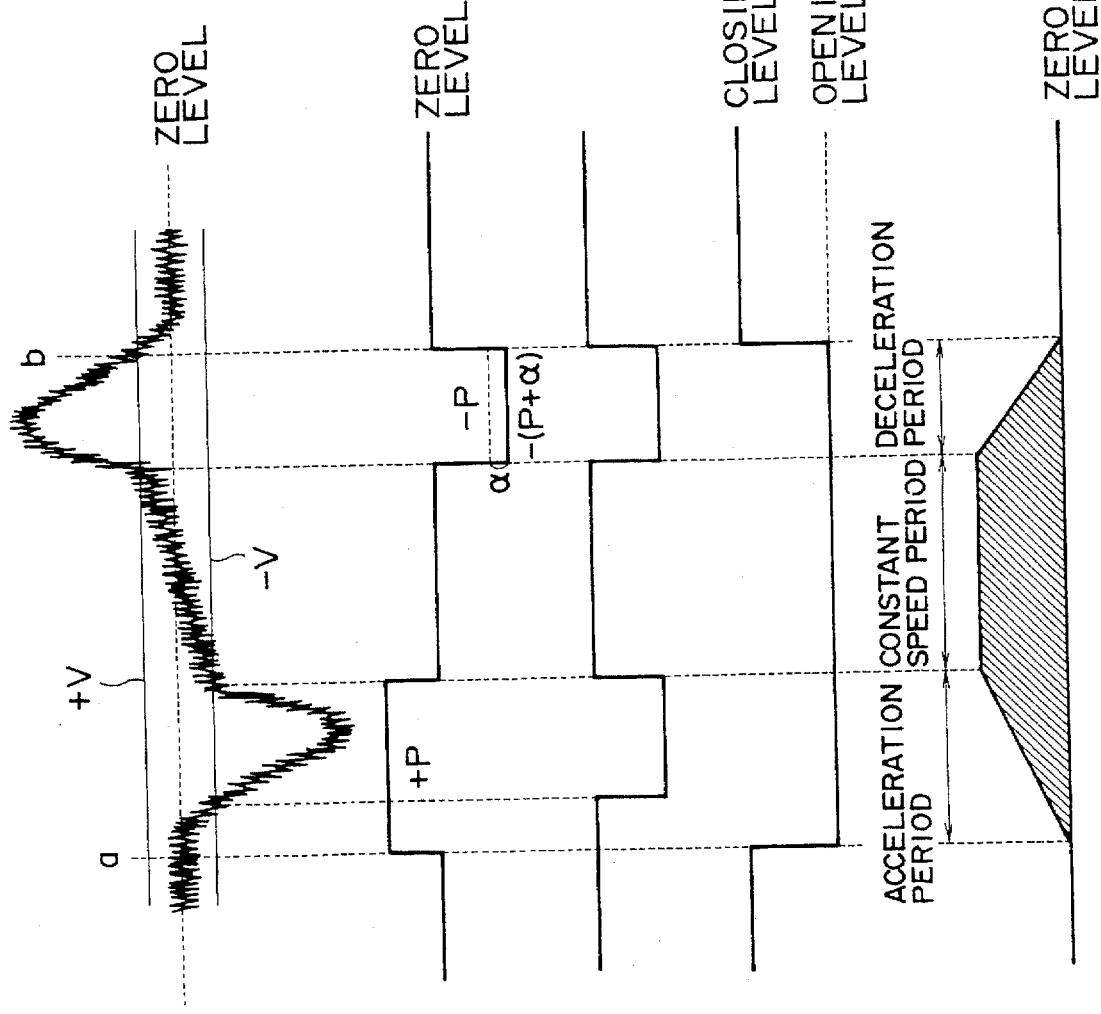
FIGS. 6A to 6E are timing diagrams illustrating an example of the output waveforms generated by another embodiment of the present invention.

When a focus jump is initiated to drive the lens actuator to focus the focal point of the light beam on the B-recording layer 47 from the A-recording layer 46, as represented by instruction S11, the servo controller 9 sends a control signal (low level signal in FIG. 6D) to the switch 5 (FIG. 1) for interrupting the focus servo loop and sends a control signal to the jump pulse generator 10 (FIG. 1) for generating an acceleration pulse having a +P level (FIG. 6B). In response to the acceleration pulse, the power driver 7 (FIG. 1) drives the lens actuator at an accelerated velocity (FIG. 6E) to focus the light beam on the B-recording layer, i.e., the lens is driven to the focus position "b".

If the zero-crossing detector 8 (FIG. 1) detects that the focus error signal (FIG. 6A) outputted from the optical pickup 3 (FIG. 1) is within the reference range of −V to +V (preset limits of the zero-crossing area), inquiry S12 is answered in the affirmative (high-level detection signal in FIG. 6C) and the servo controller sends a control signal to the jump pulse generator for halting the acceleration pulse, as represented by instruction S13. That is, the lens actuator now is driven at a constant speed (FIG. 6E). However, if inquiry S12 is answered in the negative, inquiry S12 is repeated until the zero-crossing detector determines that the focus error signal is within the zero-crossing area.

If the focus error signal is detected by the zero-crossing area detection to be no longer within the zero-crossing area, inquiry S14 is answered in the affirmative (low-level detection signal in FIG. 6C) and the servo controller sends a control signal to the jump pulse generator for generating a deceleration pulse having a −(P+α) level (FIG. 6B), as represented by instruction S15. The absolute value of this deceleration pulse −(P+α) is preset to be greater than that of the deceleration pulse (−P) in FIG. 3B. In response to the deceleration pulse, the power driver 7 drives the lens actuator at a decelerating velocity (FIG. 6E) because the "out of zero-crossing area signal" (low-level detection signal in FIG. 6C) signifies that the objective lens 11 is approaching the desired focus position "b" on the B-recording layer. However, if inquiry S14 is answered in the negative, inquiry S14 is repeated until the zero-crossing detector determines that the focus error signal is outside of the zero-crossing area.

If the focus error signal thereafter is detected to be within the zero-crossing area by the zero-crossing area detector, inquiry S16 is answered in the affirmative (high level detection signal in FIG. 6C), and the servo controller sends a control signal to the switch 5 for reconnecting the focus servo loop (high level signal in FIG. 6D) and sends a control signal to the jump pulse generator for halting the deceleration pulse, as represented by instruction S17. That is, the focus jump is completed and the focal point of the light beam is now focused on the B-recording layer 47.

The duration of the deceleration pulse is shorter than that of the acceleration pulse (and that of the deceleration pulse in FIG. 3B) because the deceleration rate (gain of P+α in absolute terms) is greater than the acceleration rate (gain of only P). The shorter deceleration period (FIG. 6E) means that the objective lens 11 (FIG. 1) reaches the desired focus position "b" on the B-recording layer faster than in the aforementioned embodiment of the present invention.

Figure 7:
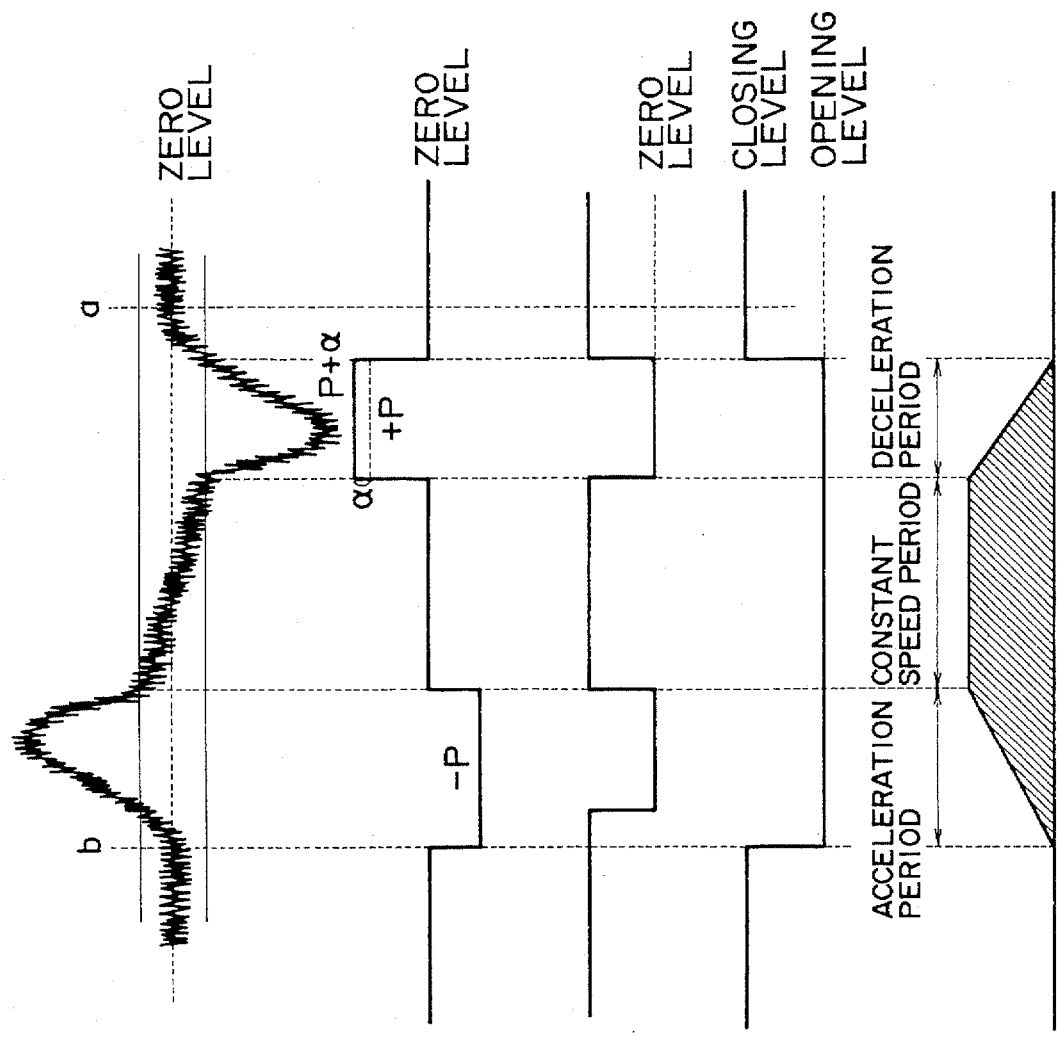
FIGS. 7A to 7E are timing diagrams illustrating another example of the output waveforms generated by another embodiment of the present invention.

FIGS. 7A–7E are timing diagrams illustrating the same process described hereinabove with respect to FIGS. 6A–6E, except a focus jump is initiated to drive the lens actuator to focus the focal point of the light beam on the A-recording layer 46 from the B-recording layer 47, i.e., focusing in the reverse direction. Instead of repeating the description of the focus jump, the description of FIGS. 7A–7E is omitted; but it is seen that the waveforms of FIGS. 7A and 7B are the mirror images of the waveforms of FIGS. 6A and 6B.

Figure 8:
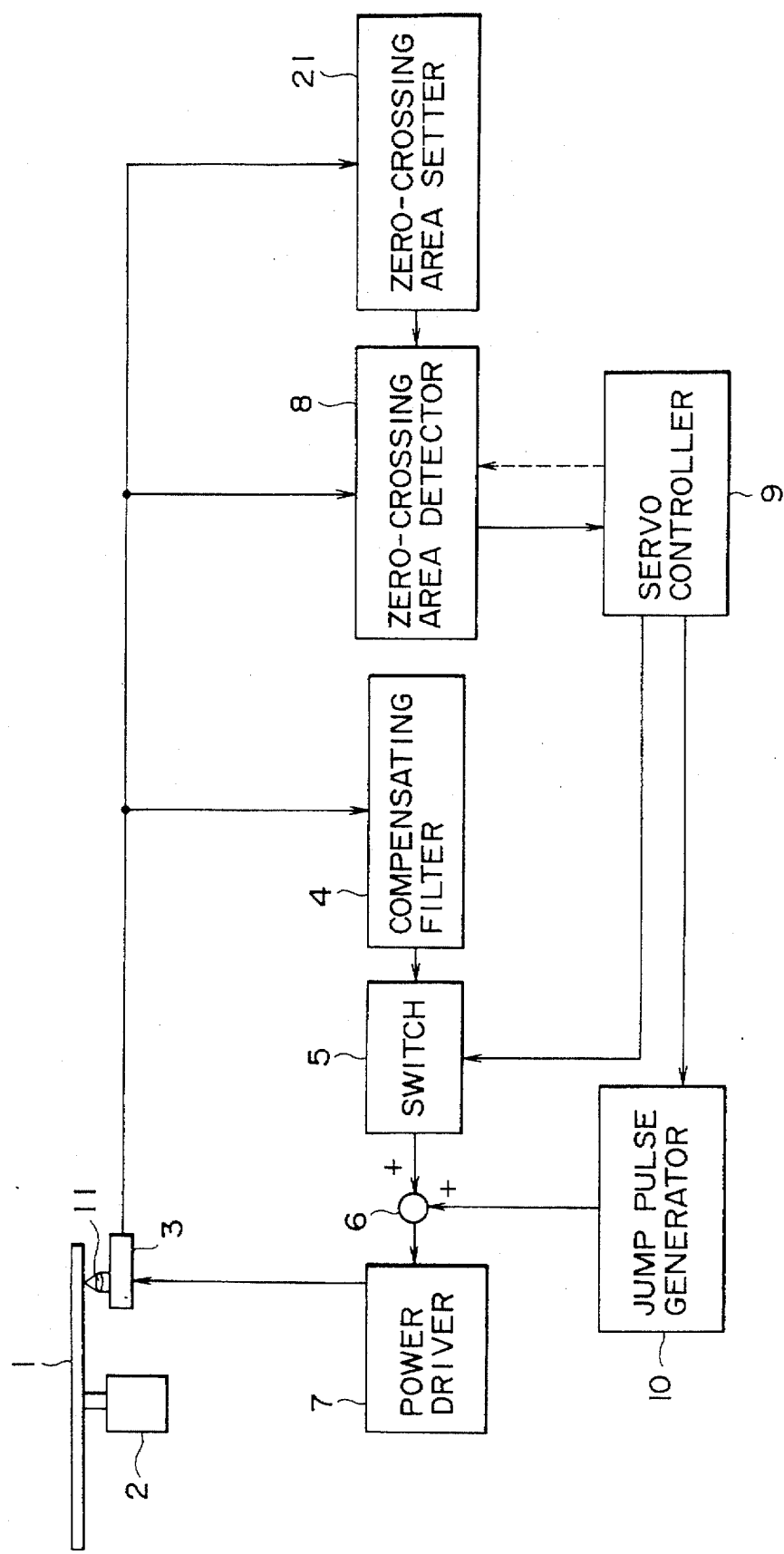
FIG. 8 is a block diagram showing a further embodiment of the present invention incorporated in the optical disk reproducing apparatus.

Referring now to FIG. 8, there is illustrated a block diagram of another embodiment of the present invention where the respective reflective properties of the recording layers are mutually different. As illustrated, the apparatus of FIG. 8 is similar to the apparatus of FIG. 1, except FIG. 8 further includes a zero-crossing area setter 21. For simplicity, elements shown in FIG. 8 corresponding to those shown in FIG. 1 are denoted by the same reference numerals and their description is omitted.

Figure 9:
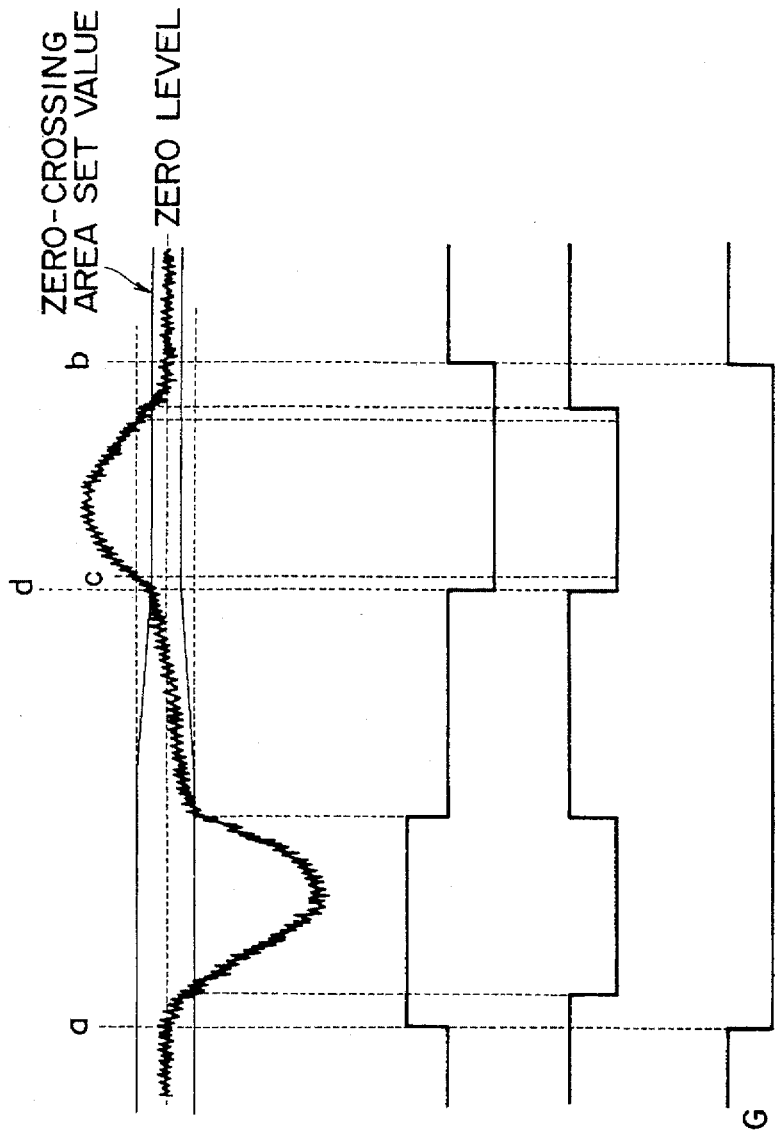
FIGS. 9A to 9E are timing diagrams showing an example of the output waveforms generated by the optical disk reproducing of FIG. 8.

Zero-crossing area setter 21 receives an input signal from the optical pickup 3 which represents the intensity of the light reflected from the optical disk 1. The zero-crossing area setter supplies a control signal to the zero-crossing area detector 8 for adjusting the boundary of the zero-crossing area in accordance with the signal level of the light reflected from each recording layer (FIG. 9A). That is, the reflected light intensity is used to modify the reference range of the zero-crossing area.

The input signal level to zero-crossing area setter 21 is proportional to the reflectivity of the respective recording layer of the optical disk 1 On which the light beam is focused. For example, if this signal is an RF signal (FIG. 9A), the zero-crossing area setter 21 detects the envelope of the RF signal and determines the reference range of the zero-crossing area as a function of the detected envelope level. The reference range is then supplied to the zero-crossing area detector 8 for determining whether the focus error signal is within the zero-crossing area. Since, in the example shown in FIG. 9A, the envelope level of the RF signal at the focus point "b" is approximately half the envelope level thereof at the focus point "a" (FIG. 9A), the reference range (the zero-crossing area) of the B-recording layer 47 is approximately half the reference range of the A-recording layer 46 (FIG. 9B). Alternatively, the input signal to zero-crossing area setter 21 may be the focus error signal, and in this case the zero-crossing area setter 21 determines the reference range to be proportional to the peak level of the detected focus error signal.

If the reflectivity of each recording layer of the optical disk 1 is changed, the reference range also is correspondingly changed by the zero-crossing area setter 21. For example, if the different reflective properties of the recording layers are ignored by setting the reference range of the B-recording layer equal to the reference range of the A-recording layer, the zero-crossing point (the point where the focus error signal enters or exits the zero-crossing area) is further from the focus position on the B-recording layer than on the A-recording layer (FIG. 9B). Consequently, the intermediate position is detected at position "c" rather than at correct position "d" in FIG. 9B. This effectively delays the generation of the deceleration jump pulse (FIG. 9C), requiring a longer time to converge on the focus point "b".

Whereas, if the zero-crossing area value is proportionally related to the envelope level of the RF signal as denoted by the solid line in FIG. 9B, the zero crossing points on each recording layer are located equidistant from their respective focus positions regardless of the different reflective properties of the respective recording layers; hence requiring less time to converge on the desired focus position.

The on/off operation of the switch 5 (FIG. 9E) is the same as in FIG. 3F.

Figure 10:
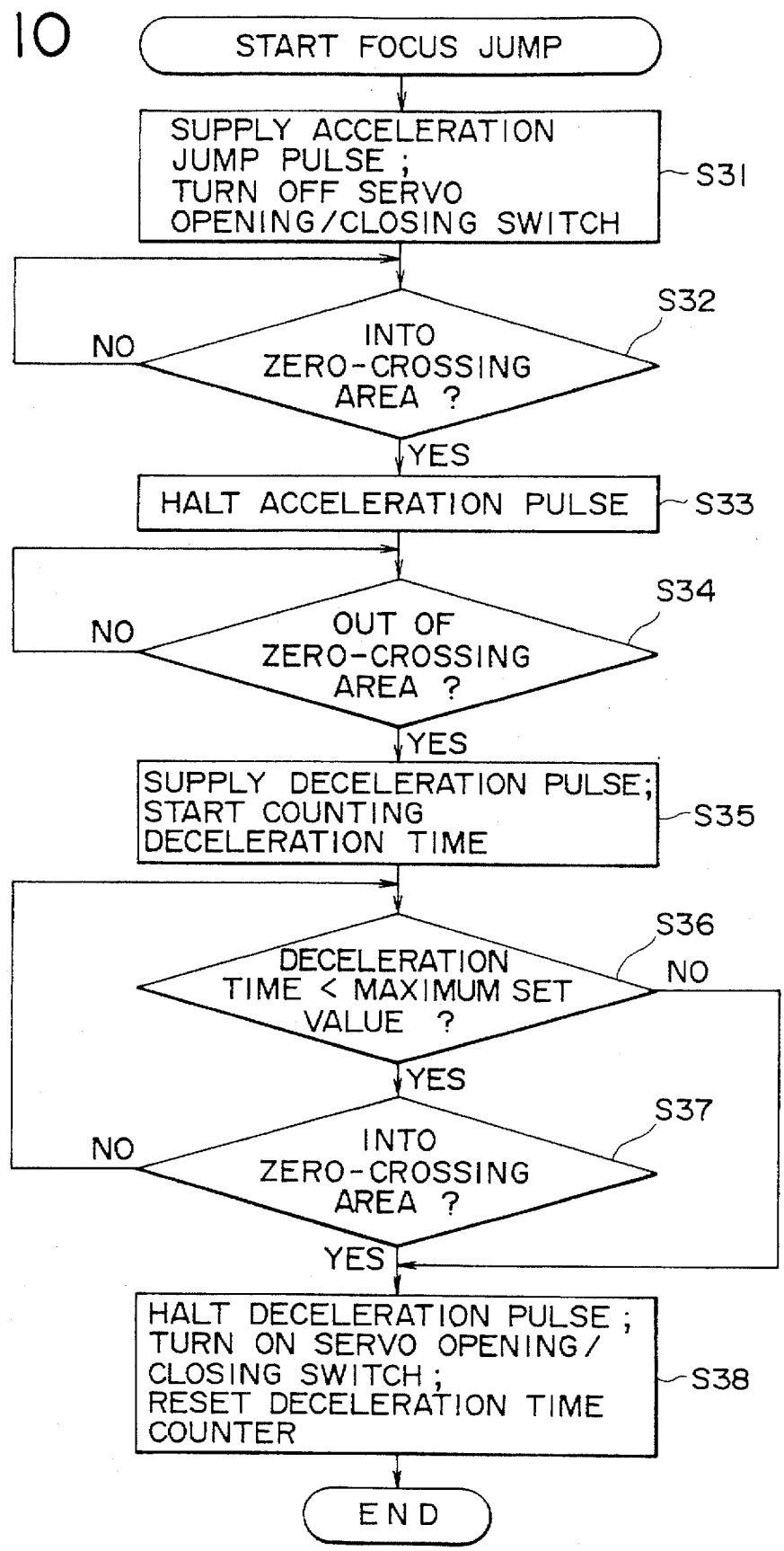
FIG. 10 is an operational flow chart to which reference will be made in describing yet another embodiment of the present invention.

In accordance with yet another embodiment of the present invention, the duration of the deceleration pulse (the maximum generation time of a deceleration jump pulse) is controlled so as to execute a stable focus jump despite any harmful, external disturbance to the recording and/or reproducing apparatus of FIG. 1. The manner in which the servo controller drives the lens actuator to execute the focus jump despite any vibration or shock to the apparatus will now be described in conjunction with the flow chart of FIG. 10 and the timing diagrams of FIGS. 11A–11E.

Figure 11:
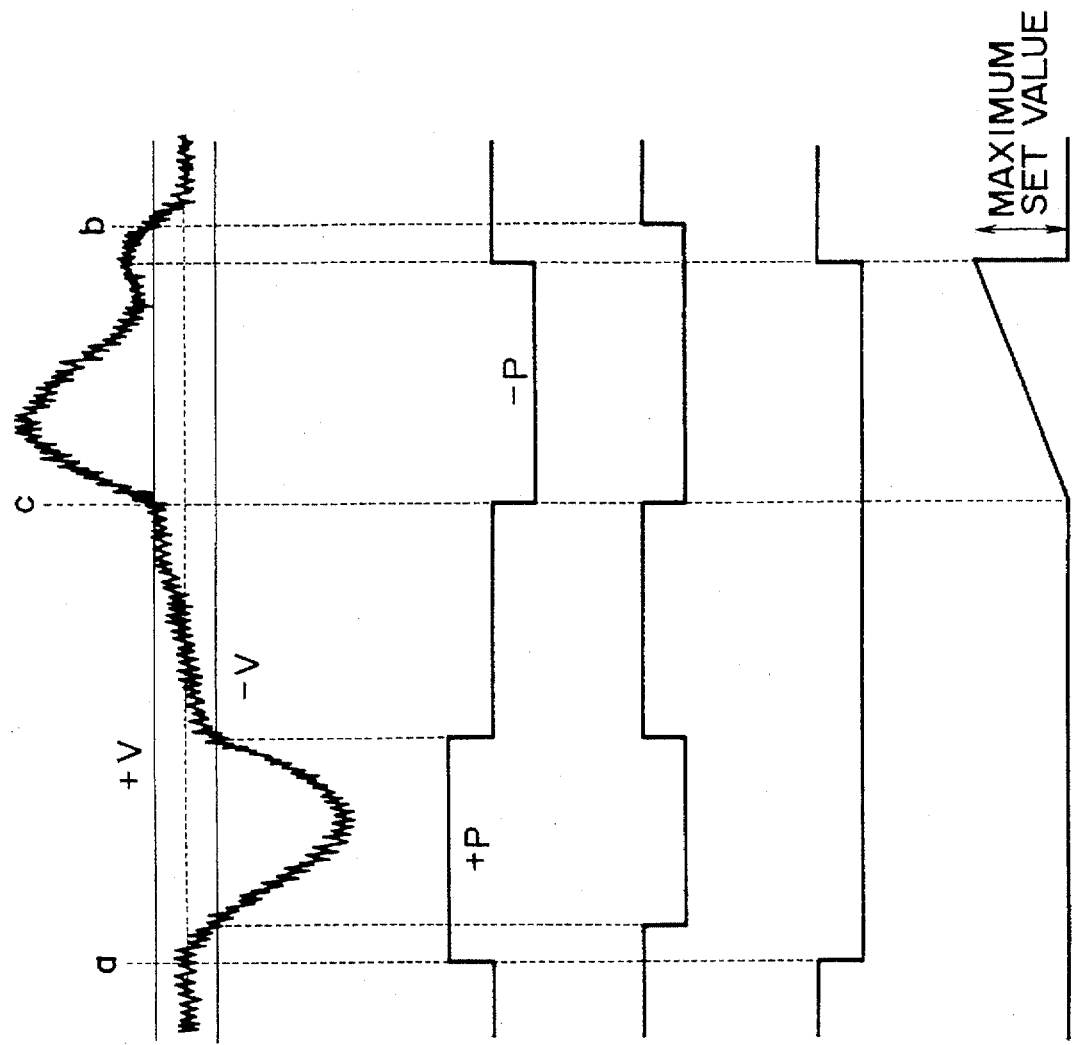
FIGS. 11A to 11E are timing diagrams showing an example of the output waveforms generated by yet another embodiment of the present invention.

When a focus jump is initiated to drive the lens actuator to focus the focal point of the light beam on the B-recording layer 47 from the A-recording layer 46, as represented by instruction S31, the servo controller 9 (FIG. 1) sends a control signal (low level signal in FIG. 11D) to the switch 5 (FIG. 1) for interrupting the focus servo loop and sends a control signal to the jump pulse generator 10 (FIG. 1) for generating an acceleration pulse having a +P level (FIG. 11B). In response to the acceleration pulse, the power driver 7 (FIG. 1) drives the lens actuator at an accelerated velocity to focus the light beam on the B-recording layer, i.e., toward the focus position "b".

If the zero-crossing detector 8 (FIG. 1) detects that the focus error signal (FIG. 11A) outputted from the optical pickup 3 (FIG. 1) is within the reference range of −V to +V (preset limits of the zero-crossing area), inquiry S32 is answered in the affirmative (high-level detection signal in FIG. 11C) and the servo controller sends a control signal to the jump pulse generator 10 (FIG. 1) for halting the acceleration pulse, as represented by instruction S33. That is, the lens actuator now is driven at a constant speed. However, if inquiry S32 is answered in the negative, inquiry S32 is repeated until the zero-crossing detector determines that the focus error signal is within the zero-crossing area.

If the zero-crossing area detector detects that the focus error signal is no longer within the zero-crossing area, i.e., the focus error signal exceeds +V, inquiry S34 is answered in the affirmative (low-level detection signal in FIG. 11C) and the servo controller sends a control signal to the jump pulse generator for generating a deceleration pulse having a −P level (FIG. 11B). Also, the servo controller initiates a timer (not shown) to measure the deceleration time (FIG. 11E), as represented by instruction S35. In response to the deceleration pulse, the power driver 7 drives the lens actuator at a decelerating velocity because the "out of zero-crossing area signal" (low-level detection signal in FIG. 11C) signifies that the objective lens 11 is approaching the desired focus position "b" on the B-recording layer. However, if inquiry S34 is answered in the negative, inquiry S34 is repeated until the zero-crossing detector determines that the focus error signal is outside the zero-crossing area.

If the measured deceleration time does not exceed the maximum set time (reference value), inquiry S36 is answered in the affirmative, and the operation advances to inquiry S37 to determine whether the focus error signal is within the zero-crossing area. If inquiry S37 is answered in the negative, signifying that the focus error signal has not yet reached the zero-crossing area, the operation returns to inquiry S36 where the inquiry is made again to, determine whether the measured deceleration time does not exceed the reference value.

However, if inquiry S36 is answered in the negative or if inquiry S37 is answered in the affirmative (high level detection signal in FIGS. 11C), the servo controller sends a control signal to the switch 5 for reconnecting the focus servo loop (high level signal in FIG. 11D), sends a control signal to the jump pulse generator for halting the deceleration pulse, and sends a control signal to the timer for resetting the time counter, as represented by instruction S38. That is, the focus jump is completed and the focal point of the light beam is now focused on the B-recording layer 47. In a normal operation state, the focus error signal level shifts into the zero-crossing area when the measured deceleration time is less than or equal to the reference value.

In contrast therewith, if any vibration or shock is applied to the device, for example, after generation of the deceleration pulse and before a shift into the zero-crossing area (before position "b" and after position "c" on the focus error signal in FIG. 11A), the objective lens 11 (FIG. 1) may traverse reversely towards the focus-jump starting layer, i.e., focus point "a", rather than moving towards the desired focus position "b" on the B-recording layer. Since the displacement speed of the objective lens 11 is substantially zero near the end of the focus jump, i.e., focus point "b", the objective lens is susceptible to external disturbance, such as gravity, shock, vibration, etc.

The above-noted conditions do not pose a problem to the present invention because the focus jump is terminated when the deceleration period exceeds the maximum allotted time. As indicated in the flow chart in FIG. 10, when the duration (generation time) of the deceleration pulse exceeds the maximum set value (FIG. 11E) prior to the generation of the zero-crossing area detection signal (the focus error signal is not within the zero-crossing area), the operation proceeds to instruction S38 where the servo controller sends a control signal to the jump pulse generator for halting the deceleration pulse and sends a control signal to the switch 5 for reconnecting the focus servo loop (FIG. 11D).

In this manner, the servo controller 9 counts the deceleration time as shown in FIG. 11E and increments the counted value in proportion to the lapse of time. FIG. 11A shows that, when the duration (count) of the deceleration time reaches the preset maximum value, the focus servo operates to displace the focus position to focus the light beam onto the B-recording layer (focus point b) prior to any reverse motion of the objective lens 11. Thus, a stable focus jump can be executed despite harmful influence of any external disturbance to the device.

Although the present invention has been explained hereinabove in conjunction with an optical disk having two recording layers, it is appreciated that the optical disk may have more than two recording layers. The focal point may be displaced to any of the layers by repeating the aforementioned focus jump.

While the present invention has been particularly shown and described with reference to preferred embodiments, it will be readily appreciated that various changes may be made without departing from the spirit and scope of the invention. It is intended that the appended claims be interpreted to include the embodiments discussed above, those various alternatives which have been described and all equivalents thereto.

What is claimed is:

1. Apparatus for driving a pickup for an optical recording medium having a plurality of recording layers, comprising:

emitting means for emitting a light beam to impinge on said optical recording medium;

receiving means for receiving said light beam reflected from said optical recording medium;

focusing means having an adjustable focal point for focusing said light beam on a respective one of said plurality of recording layers;

driving means for accelerating or decelerating said focusing means in response to a focus jump command; and control means for controlling acceleration or deceleration of said focusing means by said driving means during a predetermined period in which the focal point is displaced from one of said plurality of recording layers to another of said plurality of recording layers, said control means including focus error detector means for detecting a focus error signal level and being operable to selectively control said acceleration or deceleration based on the detected focus error signal level being within a reference range that is defined by a first predetermined threshold value and a second predetermined threshold value such that said acceleration is stopped when the detected focus error signal level is substantially equal to said first predetermined threshold value and said deceleration is started when the detected focus error signal level is substantially equal to said second predetermined threshold value.

2. The apparatus of claim 1, further comprising zero-crossing detector means for detecting when the level of the focus error signal is substantially zero; and wherein said control means is operable to halt the deceleration of said focusing means when said zero-crossing detector means detects the level of the focus error signal to be substantially zero.

3. The apparatus of claim 1, wherein said control means includes driving control means for decelerating said focusing means at a rate higher than an acceleration rate of said focusing means; and wherein said control means is operable to halt the deceleration of said focusing means when said focus error detector means detects that the level of the focus error signal is within said reference range.

4. The apparatus of claim 1, wherein said control means includes signal level detector means for detecting the signal level of said reflected light beam and reference value control means for modifying said reference range in accordance with said signal level of said reflected light beam.

5. The apparatus of claim 1, wherein said control means includes timer means for measuring a duration of deceleration of said focus means; and wherein said control means is operable to halt the deceleration of said focus means when the duration of said deceleration exceeds a predetermined period.

6. Apparatus for recording or reproducing data on an optical recording medium having a plurality of recording layers, comprising:

emitting means for emitting a light beam to impinge on said optical recording medium;

receiving means for receiving said light beam reflected from said optical recording medium;

focusing means having an adjustable focal point for focusing said light beam on a respective one of said plurality of recording layers;

driving means for accelerating or decelerating said focusing means in response to a focus jump command;

control means for controlling acceleration or deceleration of said focusing means by said driving means during a predetermined period in which the focal point is displaced from one of said plurality of recording layers to another of said plurality of recording layers, said control means including focus error detector means for detecting a focus error signal level and being operable to selectively control said acceleration or deceleration based on the detected focus error signal level being within a reference range that is defined by a first predetermined threshold value and a second predetermined threshold value such that said acceleration is stopped when the detected focus error signal level is substantially equal to said first predetermined threshold value and said deceleration is started when the detected focus error signal level is substantially equal to said second predetermined threshold value; and means for recording or reproducing data on said other of said plurality recording layers of said optical recording medium when the focal point is displaced to said other of said plurality of recording layers.

7. The apparatus of claim 6, further comprising zero-crossing detector means for detecting when the level of the focus error signal is substantially zero; and wherein said control means is operable to halt the deceleration of said focusing means when said zero-crossing detector means detects the level of the focus error signal to be substantially zero.

8. The apparatus of claim 6, wherein said control means includes driving control means for decelerating said focusing means at a rate higher than an acceleration rate of said focusing means; and wherein said control means is operable to halt the deceleration of said focusing means when said focus error detector means detects that the level of the focus error signal is within said reference range.

9. The apparatus of claim 6, wherein said control means includes signal level detector means for detecting the signal level of said reflected light beam and reference value control means for modifying said reference range in accordance with said signal level of said reflected light beam.

10. The apparatus of claim 6, wherein said control means includes timer means for measuring a duration of deceleration of said focus means; and wherein said control means is operable to halt the deceleration of said focus means when the duration of said deceleration exceeds a predetermined period.

11. A method for driving a pickup for an optical recording medium having a plurality of recording layers, comprising the steps of:

focusing a light beam at a focal point on a respective one of said recording layers;

accelerating or decelerating an objective lens in response to a focus jump command, thereby displacing said focal point; and controlling acceleration or deceleration of said objective lens during a predetermined period in which said focal point is displaced from one of said plurality of recording layers to another of said plurality of recording layers, said step of controlling including detecting a focus error signal level and selectively controlling said acceleration or deceleration based on the detected focus error signal level being within a reference range that is defined by a first predetermined threshold value and a second predetermined threshold value such that said acceleration is stopped when the detected focus error signal level is substantially equal to said first predetermined threshold value and said deceleration is started when the detected focus error signal level is substantially equal to said second predetermined threshold value.

12. The method of claim 11, further comprising the steps of detecting a focus error signal level; and displacing said objective lens at a constant speed during a period in which the focus error signal level is within a reference range.

13. The method of claim 12, further comprising the steps of detecting when the level of the focus error signal is substantially zero; and halting the deceleration of said objective lens when the level of the focus error signal is detected to be substantially zero.

14. The method of claim 12, further comprising the step of decelerating said objective lens at a rate higher than an acceleration rate of said objective lens; and halting the deceleration of said objective lens when the level of the focus error signal is detected within said reference range.

15. The method of claim 12, further comprising the steps of receiving the light beam reflected from the recording medium; detecting the level of said reflected light beam; and modifying the reference range in accordance with said level of said reflected light beam.

16. The method of claim 12, further comprising the steps of measuring a duration of the deceleration of said objective lens; and halting the deceleration when the duration of the deceleration exceeds a predetermined period.

17. A method for recording or reproducing on an optical recording medium having a plurality of recording layers, comprising the steps of:

focusing a light beam at a focal point on a respective one of said recording layers;

accelerating or decelerating an objective lens in response to a focus jump command, thereby displacing said focal point;

controlling acceleration or deceleration of said objective lens during a predetermined period in which said focal point is displaced from one of said plurality of recording layers to another with said plurality of recording layers, said step of controlling including detecting a focus error signal level and selectively controlling said acceleration or deceleration based on the detected focus error signal level being within a reference range that is defined by a first predetermined threshold value and a second predetermined threshold value such that said acceleration is stopped when the detected focus error signal level is substantially equal to said first predetermined threshold value and said deceleration is started when the detected focus error signal level is substantially equal to said second predetermined threshold value; and recording data on or reproducing data from said other of said plurality of recording layers of said optical recording medium when said focal point is detected within said proximity of said other of said plurality of recording layers.

18. The method of claim 17, further comprising the steps of detecting a focus error signal level; and displacing said objective lens at a constant speed during a period in which the focus error signal level is within a reference range.

19. The method of claim 18, further comprising the steps of detecting when the level of the focus-error signal is substantially zero; and halting the deceleration of said objective lens when the level of the focus error signal is detected to be substantially zero.

20. The method of claim 18, further comprising the step of decelerating said objective lens at a rate higher than an acceleration rate of said objective lens; and halting the deceleration of said objective lens when the level of the focus error signal is detected within said reference range.

21. The method of claim 18, further comprising the steps of receiving the light beam reflected from the recording medium; detecting the level of said reflected light beam; and modifying the reference range in accordance with said level of said reflected light beam.

22. The method of claim 18, further comprising the steps of measuring a duration of the deceleration of said objective lens; and halting the deceleration when the duration of the deceleration exceeds a predetermined period.

* * * * *